United States Patent [19]
Barnard et al.

[11] Patent Number: 5,102,015
[45] Date of Patent: Apr. 7, 1992

[54] FLUID FOOD DISPENSER

[75] Inventors: John K. Barnard, Bay Village; Richard D. Boozer, Columbia Station; Sreenivasan Sankar, Middleburg Heights; Frank P. Barnard; Michael D. Anton, both of Olmsted Township, County, all of Ohio

[73] Assignee: Vita-Mix Corporation, Cleveland, Ohio

[21] Appl. No.: 490,359

[22] Filed: Mar. 8, 1990

[51] Int. Cl.$^5$ .............................................. B67D 5/52
[52] U.S. Cl. .................. 222/135; 222/144.5; 222/146.5; 222/214; 222/333; 222/494
[58] Field of Search .............. 222/214, 333, 212, 135, 222/137, 105, 339, 409, 494, 185, 146.5, 639, 642, 144.5

[56] References Cited

U.S. PATENT DOCUMENTS

| | | | |
|---|---|---|---|
| 4,133,456 | 1/1979 | Corini | 222/146.5 |
| 4,141,474 | 2/1979 | Nilson | 222/493 |
| 4,189,071 | 2/1980 | West | 222/333 X |
| 4,372,354 | 2/1983 | Moore | 222/639 X |
| 4,513,885 | 4/1985 | Hogan | 222/95 |
| 4,614,859 | 9/1986 | Beckering et al. | 222/146.5 X |
| 4,690,307 | 9/1987 | Hogan | 222/95 |
| 4,919,075 | 4/1990 | Himi | 222/135 X |
| 4,961,508 | 10/1990 | Weimer et al. | 222/214 X |

FOREIGN PATENT DOCUMENTS 8705283  9/1987  PCT Int'l Appl. ................. 222/639

OTHER PUBLICATIONS

Pump Brochure, Cole-Parmer Instrument Company, Chicago, Ill., date unknown.
Automatic Portion Dispensers Brochure, Enertech R&D Ltd., date unknown.
Hot Server Topping Equipment Brochure, Server Products Inc., P.O. Box 249, Menomonee Falls, Wis. 53051, 1989.
Hot Cheese Nachos Brochure, Server Products Inc., P.O. Box 249, Menomonee Falls, Wis. 53051, 1988.
Server Syrup and Topping Pump Brochure, Server Products Inc., P.O. Box 249, Menomonee Falls, Wis. 53051, 1988.
This New Pouch Pack Holder . . . Brochure, Server Products Inc., P.O. Box 249, Menomonee Falls, Wis. 53051, 1988.
Warmer Merchandisers Brochure, American Permanent Ware, Inc., 729 Third Avenue, Dallas, Tex. 75226-2017, 1989.
CCW-350-P and LCCW-350-P Heated Dispensers Brochure, American Wyott Corporation, P.O. Box 1188, Cheyenne, Wyo. 82003, 1988.
Heated Dispenser Brochure, American Wyott Corporation, P.O. Box 1188, Cheyenne, Wyo. 82003, 1987.

Primary Examiner—Michael S. Huppert
Assistant Examiner—Gregory L. Huson
Attorney, Agent, or Firm—Renner, Kenner, Greive, Bobak, Taylor & Weber

[57] ABSTRACT

A dispenser according to the invention is capable of dispensing fluid food products from selected bags through nozzles attached thereto. An actuator plate has one edge provided with V-shaped slots. A push rod carries the actuator plate and positions a selected V-shaped slot adjacent to the selected nozzle. The other end of the actuator plate is in engagement with a cam assembly driven by a motor. The rod can be pushed to engage a switch to activate the motor which moves the actuator plate so that a V-shaped slot engages a nozzle to dispense the selected fluid food. A return spring assures that the actuator plate is in constant engagement with the cam assembly.

39 Claims, 6 Drawing Sheets

FLUID FOOD DISPENSER

TECHNICAL FIELD

This invention relates to an apparatus for dispensing fluid food products. More particularly, this invention relates to such a device which can automatically dispense metered amounts of hot fluids such as fudge, cheese or the like as well as cool fluids such as ketchup, mustard or the like. The dispensing of such products takes place in an absolute sterile environment, that is, none of the food products are ever in contact with any portion of the dispensing device.

BACKGROUND ART

In the high volume food service industry it is desirable to be able to quickly dispense a metered amount of fluid food product. Such is important not only in the fast food environment where the server must be able to quickly dispense accurate amounts of food product, but also in the self-service environment where the customer himself dispenses the fluid, for example, a hot fudge topping to a dish of ice cream.

In some prior dispensers of which we are aware, the food product is merely poured into a cavity which, if necessary, as in the case of dispensing hot fudge, cheese, syrup or the like, is heated. In other dispensers, a can of the food to be dispensed is positioned in a hot water bath and heated thereby. In both instances the fluid may be dispensed by the use of a hand operated pump. However, such operation is not always desirable, particularly in the self-service situations, because the user may use his own discretion as to the amount of product being dispensed. Moreover, such hand pump operation inevitably leaves a certain amount of wasted food undispensed, that is, the pumps will not fully deplete the container resulting in wasted food product.

To avoid at least some of these potentially economically disadvantageous effects, many dispensers are provided with sophisticated metering pumps which, when activated, dispense a precise amount of fluid. However, such pumps are quite costly and require frequent maintenance, thus adding significantly to the cost and efficiency of the dispensing unit.

Moreover, in all such dispensers, several deleterious "food zones" exist, that is, locations where the food product comes into contact with the mechanisms of the dispenser. Thus, the law requires that all of these food zones, such as the cavity, the pump and the like, must be frequently cleaned to assure the sanitary nature of the dispenser. However, both the hand pumps and the sophisticated metering pumps are quite difficult to clean requiring a great deal of time and effort on the part of the user and the resulting downtime of the dispenser.

In an attempt to eliminate such food zones, some dispensers, such as shown in U.S. Pat. Nos. 4,513,885 and 4,690,307, dispense the fluid food product from a plastic bag through a relatively long tube attached thereto. Through a hand operated peristaltic pumping action, a plurality of rollers squeeze the tube to draw fluid from the bag on one side of the rollers and discharge fluid from the tube on the other side of the rollers. While solving some of the food zone problems discussed above, such a peristaltic system does not eliminate the problems associated with hand pumps having a number of movable parts, nor does it provide a positive shut-off for the food product about to be dispensed from the other side of the rollers. Thus, that food product can, and will be, exposed to air and the bacteria associated therewith while awaiting to be dispensed by the next hand pump operation. Moreover, it would be difficult, if not impossible, to uniformly heat both the bag and the tube if the dispensing of hot fluids were desired. Similarly, any electrical equipment associated with such heating, or with automating the hand operation, would of necessity not be self-containable in a separate unit and thus would render cleaning and maintenance of the device difficult and impractical.

DISCLOSURE OF THE INVENTION

It is thus an object of the present invention to provide a device which will automatically dispense all types of fluid food products, both those which must be heated and those which may be dispensed at room temperature.

It is another object of the present invention to provide a device, as above, in which there are no food zones, that is, no areas where the food products come into contact with any portion of the device.

It is a further object of the present invention to provide a device, as above, which when dispensing products which need to be heated, provides uniform heat to all of the product awaiting to be dispensed.

It is an additional object of the present invention to provide a device, as above, in which all electrical components, such as the drive motor, timing devices, heating elements and the like, are contained in a separate housing which is easily detachable from the device for safe cleaning of the device and for ease of maintenance of the electrical components.

It is yet another object of the present invention to provide a device, as above, which is capable of containing a plurality of products, dispensing the same one at a time, with a single drive motor thereby providing a unit which, while being able to dispense multiple products, is nevertheless compact.

It is yet another object of the present invention to provide a device, as above, which dispenses the food products until depleted, there being no wasted left over products.

These and other objects of the present invention, as well as the advantages thereof over existing prior art forms, which will become apparent from the description to follow, are accomplished by the means hereinafter described and claimed.

In general, the dispensing device is designed to dispense fluid contained in a bag through a nozzle attached to the bag. A motor drives a cam roller or the like which engages an actuator device which squeezes the nozzle to dispense fluid therefrom. A control rod is utilized to activate the motor as desired.

A preferred exemplary fluid food dispensing device incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
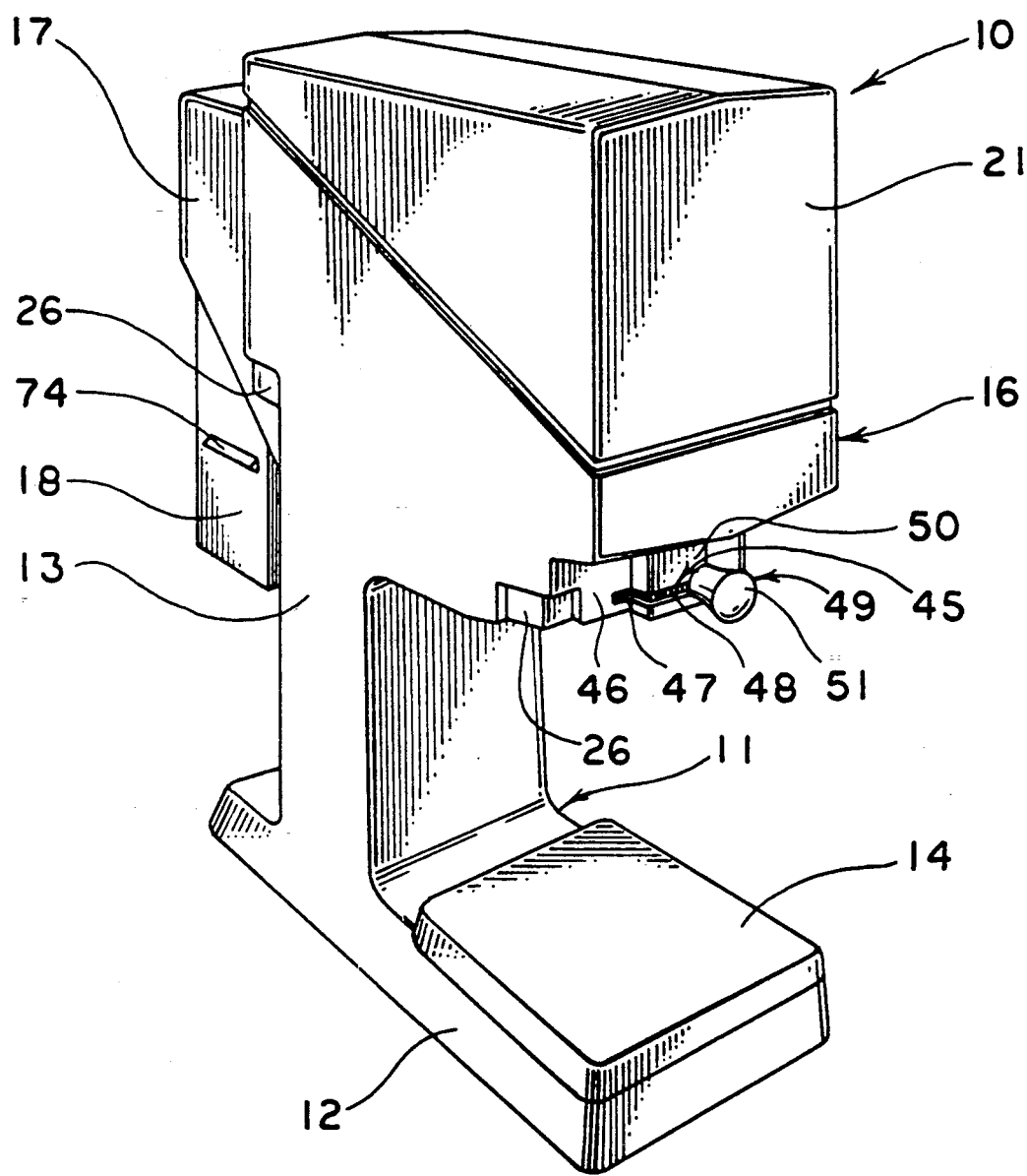
FIG. 1 is a perspective view of a fluid food dispensing device according to the concepts of the present invention.
Figure 2:
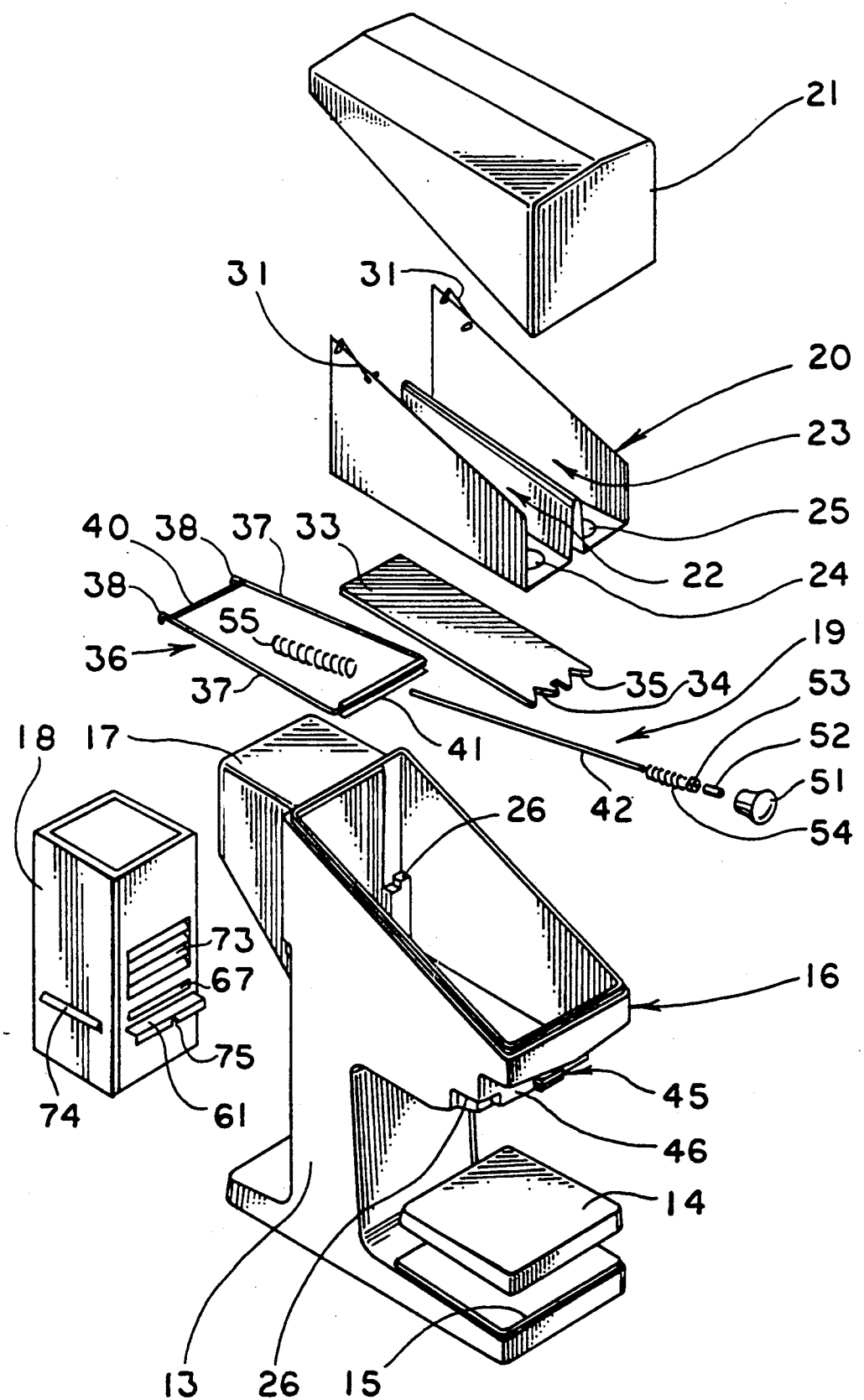
FIG. 2 is an exploded perspective view showing some of the components of the fluid food dispensing device.

A fluid food dispenser according to the concepts of the present invention is generally indicated by the numeral 10 in FIG. 1 with the basic component parts thereof being shown in FIGS. 1 and 2. As shown, dispenser 10, many of whose components can be molded of a polymeric material, includes a pedestal generally indicated by the numeral 11, which includes a base portion 12 and a stanchion portion 13 extending generally vertically upwardly from near the rear of the base portion 12. The front of base portion 12 is provided with a removable platform 14 which nests on a socket 15 formed in base portion 12.

Stanchion 13 carries a main plastic housing generally indicated by the numeral 16 which is preferably integrally formed with stanchion 13. A chamber 17 is positioned at the upper back end of housing 16 and receives a removable motor and control housing 18 which is preferably made of a metallic material and which is detachable from housing 16. As will hereinafter be described, housing 18 carries all of the electrical components of dispenser 10. Chamber 17 has an open front end which communicates with the open rear end of housing 16.

An actuator assembly, generally indicated by the numeral 19, and a food support plate 20 (FIG. 2) are received within housing 16 and a removable cover 21 may be positioned on the top thereof to close dispenser 10. Food support plate 20 is preferably formed of a metallic material and is configured in the shape of a W thereby forming two compartments 22 and 23 having nozzle receiving apertures 24 and 25, respectively, near the front thereof. Plate 20 is positioned within housing 16 on four ledges 26 located at the corners of housing 16 such that apertures 24 and 25 will be aligned with apertures 27 and 28 (FIG. 6), respectively, located in the bottom 29 of housing 16 near the front thereof. Ledges 26 at the rear corners of housing 16 are higher than those at the front corners thereby locating apertures 24 and 25 generally at the lowest point of plate 20.

Each compartment 22 and 23 of food support plate 20 is designed to receive a bag 30 (FIG. 3) containing the fluid food product to be dispensed. Bags 30 are preferably made of a plastic material and are held in a fluid dispensing position within compartments 22 and 23 as by clips 31 somewhat schematically shown in FIGS. 2 and 3. Affixed to each bag 30, at the bottom thereof when it is in the dispensing position, is a tubular valve or nozzle 32. Nozzles 32 extend through the apertures 24 and 25 of food support plate 20 as well as apertures 27 and 28 in the bottom 29 of housing 16. Nozzles 32 are of the type which are flexible and will emit a predetermined amount of product upon each squeezing thereof. Typical of such nozzles is that shown in U.S. Pat. No. 4,141,474 to which reference is made for whatever details may be necessary to understand how nozzles 32 cooperate with the other structures of the present invention to provide a unique food dispenser 10.

Actuator assembly 19 is positioned within housing 16 between the bottom 29 thereof and food support plate 20 and includes a generally rectangular actuator plate 33 which may be formed of any suitable plastic material. The front edge of plate 33 is provided with two V-shaped slots 34, 35 which, as will hereinafter be described in detail, squeeze nozzles 32 to dispense fluid food from bags 30.

Figure 6:
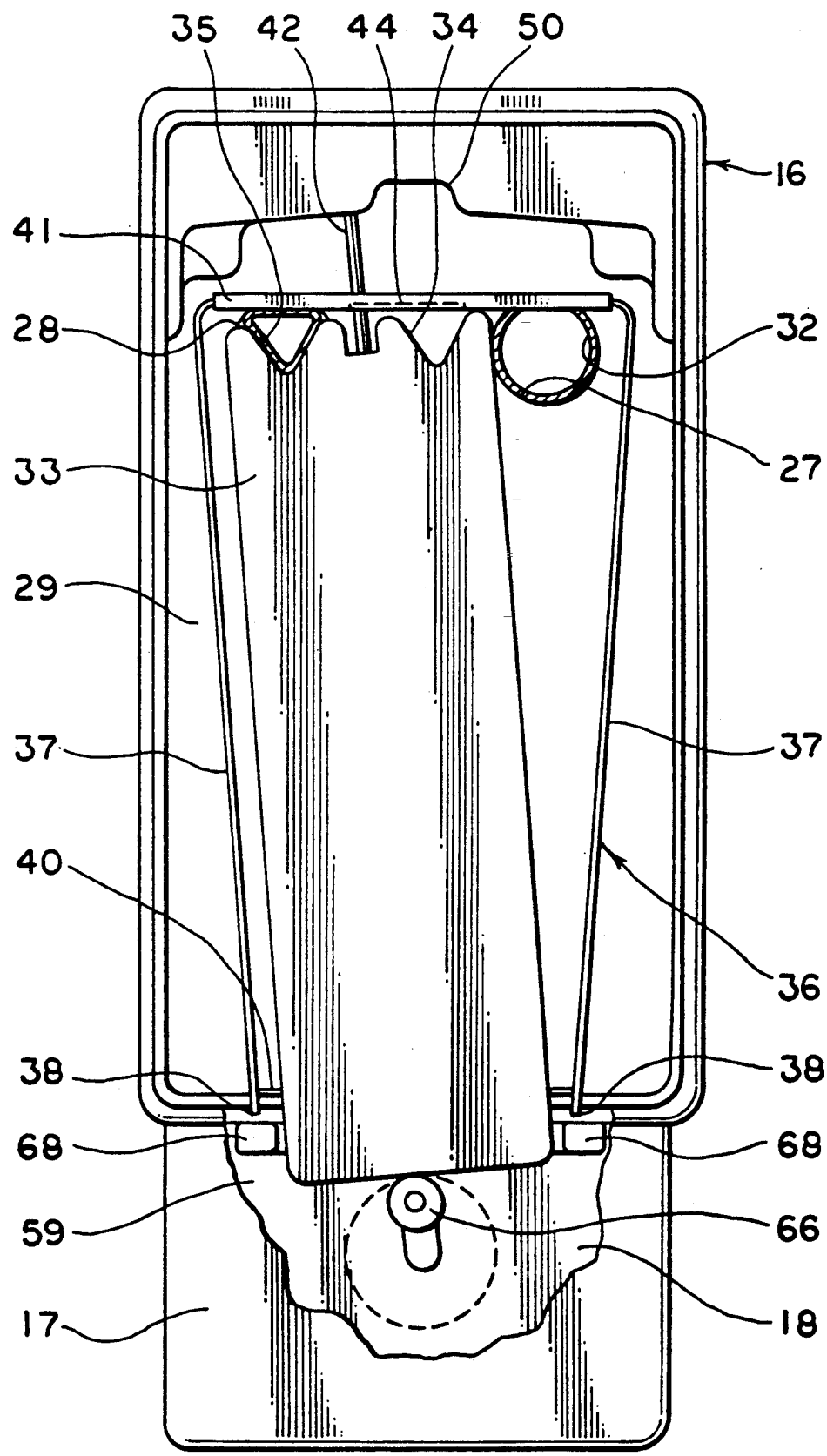
FIG. 6 is a plan view of the actuating mechanism for the fluid food dispensing device.
Figure 7:
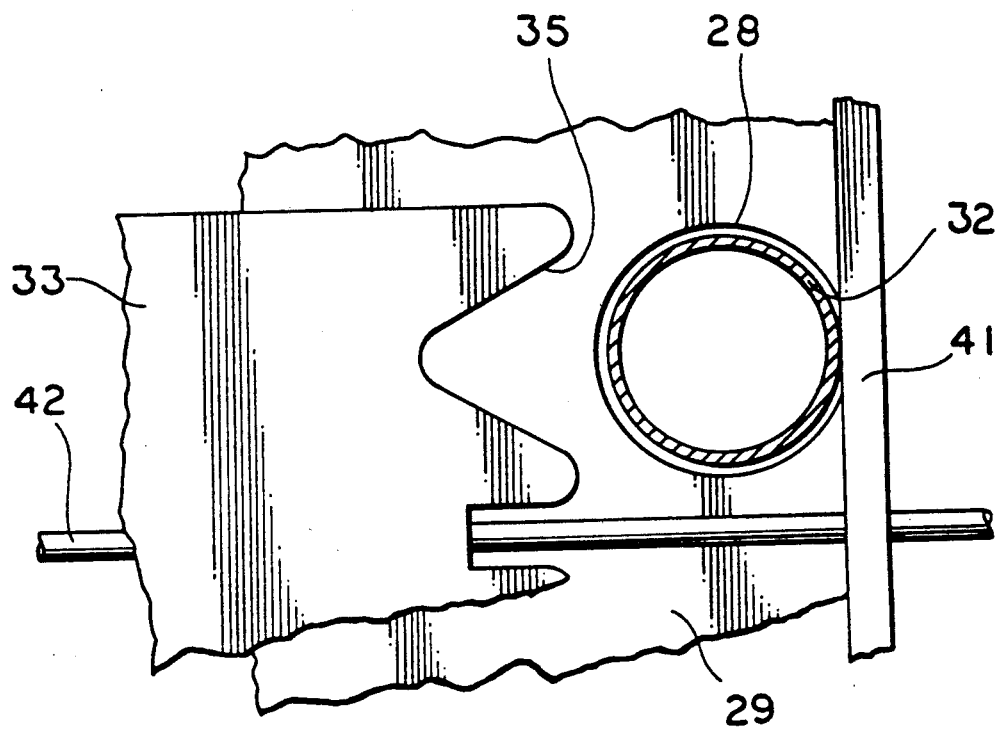
FIGS. 7 and 8 are somewhat schematic fragmented plan views similar to FIG. 6 showing the operation of the actuating mechanism to dispense food from the device.

Actuator assembly 19 can also include a metallic yoke frame member generally indicated by the numeral 36 in FIGS. 2 and 6 which has side bars 37 extending generally longitudinally within housing 16 above bottom surface 29 thereof and slightly below actuator plate 33. Side bars 37 terminate at the back end thereof as downturned hooks 38 which are adapted to rest on or otherwise engage a rear ledge 39 of housing 16 extending upwardly from bottom surface 29. A rear cross frame 40 extends between side bars 37 in front of hooks 38 and parallels; and is positioned just in front of, rear ledge 39. A front bearing plate 41 extends between side bars 37 at the front of yoke frame 36 and is positioned just to the front of nozzles 32. Side bars 37 are designed to be of a specific length, that is, to accurately extend from ledge 39 to a point to locate front bearing plate just beyond nozzles 32.

Actuator assembly 19 also includes an activating push rod 42, the rear end of which extends through a hole 43 in ledge 39 and the front end of which extends through a slot 44 in front bearing plate 41 of yoke member 36. The front end also extends through a slot, indicated generally by the numeral 45, in front surface 46 of housing 16. For purposes which will hereinafter become evident, slot 45 permits rod 42 to be located within slot 45 at a first operating position 47, a neutral position 48 and a second operating position 49. The neutral operating position is defined by a platform 50 formed in front surface 46 of housing 16.

The front end of rod 42 is threaded to receive a knob 51 positioned outside of housing 16, and a threaded spacer 52 and nut 53 between housing 16 and bearing plate 41 of yoke member 36. In addition, a coil spring 54 can be received around rod 42 between nut 53 and bearing plate 41. A coil spring 55 is also positioned around rod 42 on the other side of bearing plate 41 and bears not only against plate 41 but also against a slotted bearing lug 56 which extends downwardly from actuator plate 33 and permits rod 42 to pass therethrough. Rod 42 can thus move longitudinally with respect to plate 33 through bearing lug 56 but when rod 42 is moved laterally through slot 45, plate 33 will move somewhat arcuately laterally therewith. The manner in which knob 51, spacer 52, nut 53, and springs 54 and 55 cooperate to enable actuator assembly 19 to dispense fluid food from dispenser 10 will hereinafter be described in detail.

Figure 3:
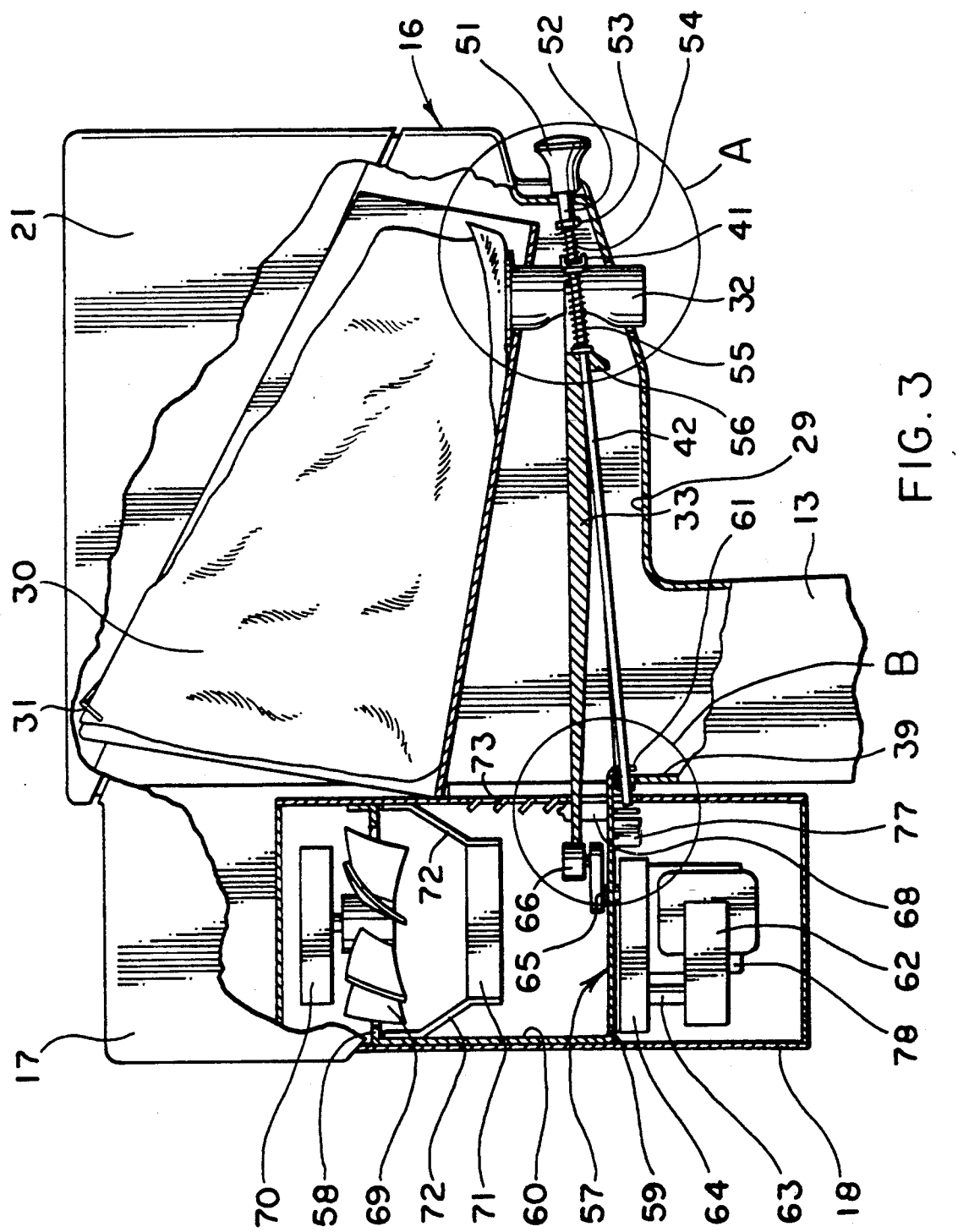
FIG. 3 is a fragmented somewhat schematic side elevational view of the fluid food dispensing device of FIG. 1 having portions of the side of the housings broken away.
Figure 4:
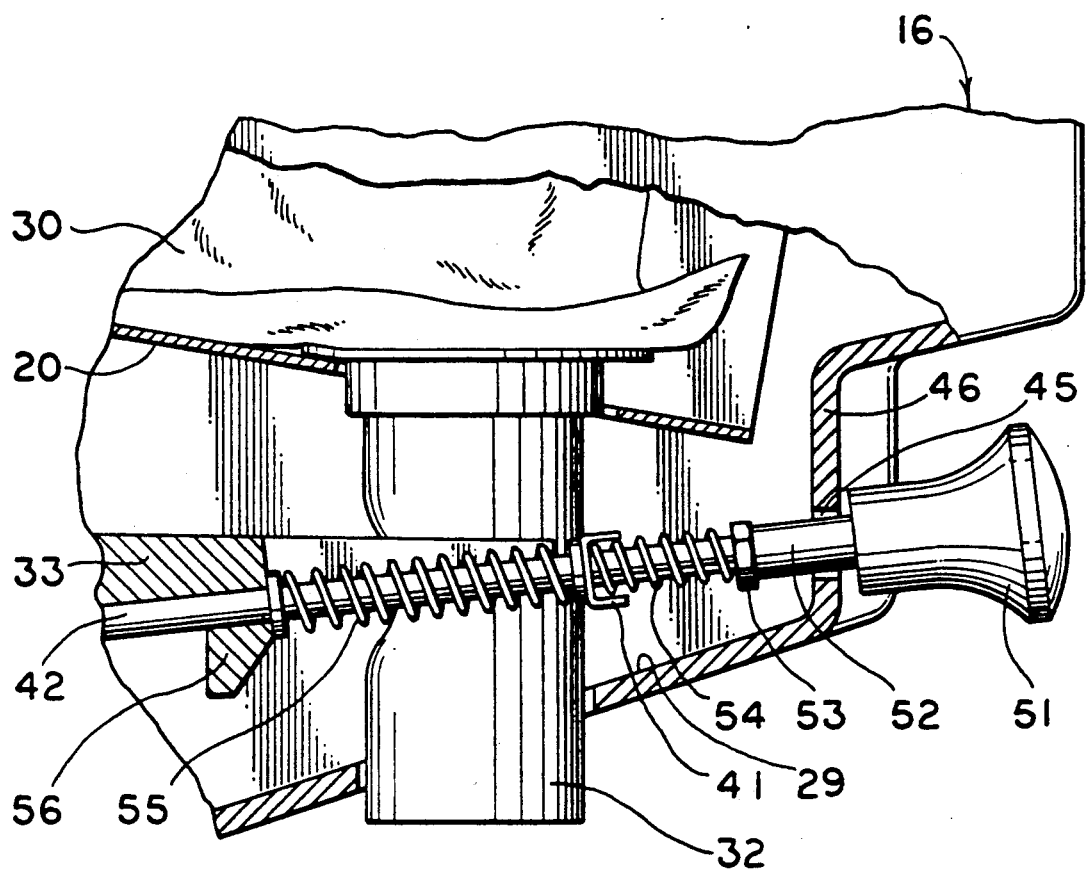
FIG. 4 is an enlarged view of that portion of FIG. 3 enclosed in the circle labeled A.
Figure 5:
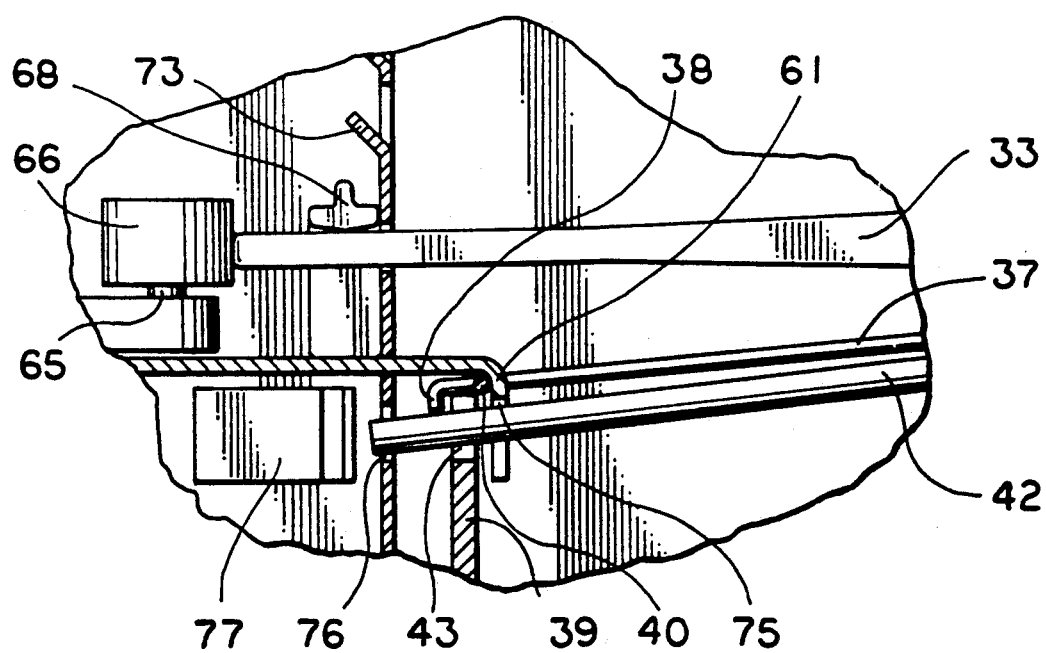
FIG. 5 is an enlarged view of that portion of FIG. 3 enclosed in the circle labeled B.

As schematically shown in FIG. 3, the metallic motor and control housing 18 contains a number of electrical and control components for operating dispenser 10. The major structural component within housing 18 is a C-shaped frame, indicated generally by the numeral 57, which carries all of the components within housing 18. Frame 57 includes an upper branch 58 having its outer end affixed to the front of housing 18, a lower branch 59, and a central branch 60 spanning between branches 58 and 59 and affixed to the rear of housing 18. Lower branch 59 continues forwardly outwardly of housing 18 and terminates as a downturned flange 61 which rests over ledge 39 and cross frame 40 of yoke member 36. Such an arrangement not only renders housing 18 removable from the remainder of dispenser 10, as by lifting housing 18 from engagement with ledge 39, but also it establishes a positive determination of the distance between bearing plate 41 of yoke member 36 and all of the other components within housing 18 thereby avoiding a tedious molding of the plastic portions of dispenser 10 within critical tolerances.

Lower branch 59 of frame 57 carries a motor and coil assembly 62 which, when activated, rotates a shaft 63 which through a gear reducer 64 rotates a shaft 65. Shaft 65 extends through branch 59 of frame 57 and carries a cam roller assembly 66 at the top thereof. As will hereinafter be described in more detail, actuator plate 33 extends through a slot 67 in housing 18 and the back edge thereof is in constant contact with cam roller 66. Guide blocks 68 mounted within housing 18 on each side of slot 67 provide support to the back portion of plate 33.

Upper branch 58 of frame 57 can also carry a fan 69 driven by motor 70 also carried by branch 58. Fan 69 is positioned within an opening in branch 58 and directs air toward a resistance coil heater 71 carried by branch 58, as by metallic strap members 72. Thus, fan 69 directs air past heater 71 and out of housing 18 through ducts 73 and into housing 16. As such, if the food product being dispensed needs to be heated, the air around bags 30 and the conductive food support plate 20 will uniformly do so. Of course, as may be desired, a thermostat or other temperature control device may be provided. Due to the positioning of the components on C-frame 57, the only heated area therein is between branches 58 and 59 thereof. Thus, motor 70 and all of the components below branch 59, such as motor 62 and the like, are not directly exposed to the heat generated by heater 71. However, any undesirable heat buildup in housing 18 below lower branch 59 of frame 57 may be dissipated to the atmosphere through a side duct 74 in the lower portion of housing 18.

Push rod 42 extends through a slot 75 (FIG. 2) in downturned flange 61 of lower branch 59 of frame 57 and also through an aperture 76 in the front of housing 18. The inner end of push rod 42 is thus positioned adjacent to a rocker arm actuator switch 77. As will hereinafter be described in more detail, when push rod 42 engages switch 77, motor 62 is activated. If desired, a conventional adjustable timer circuit 78 may be placed in the motor circuit to limit the time in which motor 62 operates after being activated.

The proper assembly of dispenser 10 to prepare it for operation will now be described in detail. With push rod 42 assembled on yoke member 36, that is, with rod 42 extending through slot 44 of bearing plate 41, with spring positioned on one side of bearing plate 41, and with spacer 52, nut 53 and spring 54 positioned on the other side thereof, yoke member 36 and push rod 42 may be positioned in the bottom of housing 16 by engaging rear ledge 39 with hooks 38 of yoke member 36. The rear end of push rod 42 may then be extended through hole 43 in ledge 39 and the front end thereof may be passed through slot 45 in the front surface 46 of housing 16 so that knob 51 may be threaded thereon to hold rod 42 in place.

Motor housing 18 may then be positioned within chamber 17 by engaging ledge 39 and cross frame 40 of yoke member 36 with downturned flange 61, push rod 42 being located within the slot 75 in flange 61. As previously indicated, this connection now positively locates all of the members within housing 18 with respect to the other members of dispenser 10. That is, all members attached to C-frame 57, of which flange 61 is a part, are positively located with respect to bearing plate 41 of yoke member 36. With the end of push rod 42 now in position generally adjacent to rocker arm switch 77, spacer 52 and nut 53 may be adjusted to positively position the end of rod 42 so that upon pushing on knob 51, rocker arm switch 77 will be properly engaged and so that, as will hereinafter be described, rocker arm switch 77 cannot be engaged when knob 51 is in the neutral position 48 of slot 45.

Actuator plate 33 may now be installed by sliding the back end thereof through slot 67 in motor housing 18 and manually compressing spring 55 against bearing plate 41 of yoke member 36 until it is in front of lug 56 of actuator plate 33 at which time spring 55 will urge plate 33 toward cam roller 66 in motor housing 18 so that the back edge of plate 33 is always in contact with roller 66.

The metallic food support plate 20 can then be positioned within housing 16, resting on ledges 26. Because the ledges 26 at the rear of housing 16 are higher than the ledges 26 at the front of housing 16, and thus support plate 20 generally slopes downwardly from the rear of housing 16 to the front thereof, apertures 24 and 25 therein will be at about the lowest point of support plate 20 and will be aligned with apertures 27 and 28 in the bottom 29 of housing 16. Bags 30 of selected food products can now be positioned within compartments 22 and 23 of plate 20 with the nozzles 32 thereof extending through apertures 24 and 27 as well as 25 and 28 and being positioned adjacent to bearing plate 41 of yoke member 36. The bags 30 may then be lifted to essentially spread the bags to an extended position and the tops thereof attached to plate 20 at the end of the bags opposite from nozzles 32, as by clips 31. Fluid food in bags 30 is thus urged by gravity to flow toward nozzles 32 so that as fluid is being dispensed therefrom, bags 30 will eventually be completely emptied. Cover 21 is then positioned on housing 16 and dispenser 10 is ready for operation.

In operation, the electrical power is turned on, as by a switch (not shown) which, if dispenser 10 is designed to be utilized to dispense warm or hot liquids, turns on fan 69 and coil heater 71 such that warm air will begin to fill housing 16 not only heating the food within bags 30 by convection but also heating metallic plate 20 which by conduction will heat the food within bags 30. If the food to be heated is rather viscous in its cool state, such as fudge and the like, dispenser 10 must first warm the food to a temperature at which it will freely flow. In this regard, a thermostat may be provided to control the temperature of the air in housing 16. Of course, if the fluid in bags 30 are to be dispensed in a cool state, fan 69 and heater 71 would not be needed and if provided in the particular dispenser 10 being utilized, may be turned off by the setting of the thermostat.

Figure 8:
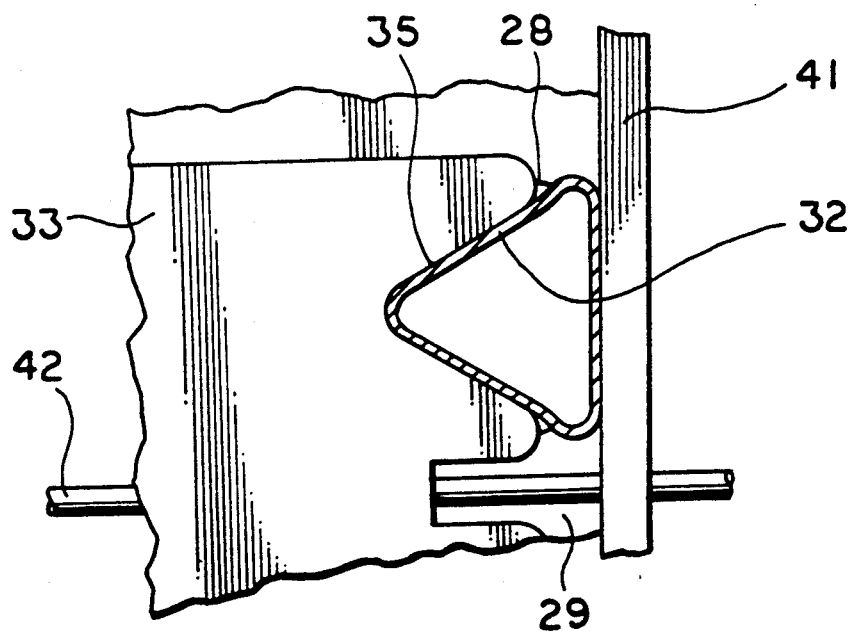

When the fluid food is ready to be dispensed, the user selects the desired food by moving push rod 42 within slot 45 to either the first operating position 47 or second operating position 49. Such action aligns the appropriate V-shaped slot 34 or 35 of actuator plate 33 with the nozzle 32 of the bag 30 of food selected. Thus, as shown in FIGS. 1 and 6-8, rod 42 is positioned in the second operating position 49 and V-shaped slot 35 is aligned adjacent to the nozzle 32 in aperture 28 of housing 16. At this point the user may push knob 51 inwardly moving rod 42 longitudinally to allow rod 42 to engage switch 77 which activates motor 62 thereby rotating shaft 65 and activating cam roller 66. Such action compresses spring 55 and moves plate 33 to squeeze nozzle 32 as shown in FIG. 8 and thereby dispense a metered shot of fluid therefrom. It should be noted that as shown in FIG. 6 when nozzle 32 in aperture 28 is being squeezed by V-shaped slot 35, V-shaped slot 34 passes by the nozzle in aperture 27 assuring that no fluid is dispensed therefrom. It should also be noted that the squeezing action created by V-shaped slot 35 is a very efficient manner in which to dispense fluid from nozzle 32 because it is being constricted on three sides, that is, between the two sides of notch 35 and bearing plate 41. As cam roller 66 moves away from the fully stroked position shown in FIG. 8, spring 55 assures that plate 33 moves with it to the FIG. 7 position such that another rotation of cam roller 66 initiates a second reciprocating motion to plate 33 to again squeeze nozzle 32 to dispense fluid food from bag 30.

If dispenser 10 is equipped with a timer 78 as shown, it can be set to operate motor 62 and thereby reciprocate plate 33 for a desired length of time to meter out the desired portion of fluid food. Thus, for example, if the portion of food desired to be dispensed upon each actuation of rod 42 will be dispensed with five squeezings of nozzle 32, motor 62 will operate for that period of time. Upon completion of the cycle, a spring bias in switch 77 will have returned rod 42 outwardly away therefrom. To assure such a return, spring 54 can be provided to provide an additional returning force. Dispenser 10 can also be operated without a timer 78 and thus fluid can be dispensed therefrom either one shot at a time by sequential pushing on knob 51 or continuously by holding knob 51 inward.

If the user then wishes to dispense fluid from the bag in compartment 22, knob 51 and rod 42 are merely moved in slot 45 to first operating position 47 and the process is repeated. It should be appreciated that platform 50 in front surface 46 of housing 16 prohibits the activation of rod 42 in the neutral position 48 of slot 45 because knob 51 cannot be pushed inwardly at that position. Thus, the potential deleterious effect of having the edges of V-shaped slots 34 and 35 partially compress both the nozzles 32 at the same time is avoided. It should also be appreciated that dispenser 10 could be modified to dispense more than two products in a single unit or just a single product without departing from the spirit of this invention.

When a bag 30 of food becomes depleted, a fresh bag may merely be substituted therefor without having to clean any component of dispenser 10. Moreover, when cleaning of the dispenser becomes necessary, or when maintenance on a component in motor housing 18 may be required, housing 18 is readily removable from the remaining portions of dispenser 10 so that they can be cleaned without damage to the electrical components or so that the electrical components may be maintained.

It should thus be evident that a dispenser 10 constructed and operated as described herein accomplishes the objects of the present invention and otherwise substantially improves the fluid food dispensing art.

We claim:

1. Apparatus for dispensing fluid material comprising at least one bag holding a quantity of the material, a nozzle connected to said bag to emit the material being dispensed upon contact, plate means moveable to engage said nozzle, a motor, means driven by said motor and communicating with said plate means so that said plate means engages said nozzle, and means to activate said motor so that said plate means engages said nozzle to emit the material.

2. Apparatus for dispensing fluid material contained in a bag having a nozzle attached thereto which emits material upon contact comprising, a motor, an actuator plate engageable with the nozzle at one end thereof, switch means to activate said motor, rod means to engage said switch means to activate said motor, and means driven by said motor and engaging the other end of said actuator plate so that upon activation of said motor fluid material is dispensed from the bag through the nozzle.

3. Apparatus according to claim 2 wherein said means driven by said motor is a cam roller assembly engaging said other end of said actuator plate.

4. Apparatus according to claim 2 wherein said one end of said actuator plate is provided with a V-shaped slot to engage the nozzle.

5. Apparatus according to claim 2 further comprising a housing carrying the bag and said actuator plate, a slot in said housing, said rod means extending through said slot, a knob on the end of said rod means outside said housing, and means on said rod means to adjust the position thereof relative to said switch means.

6. Apparatus according to claim 2 further comprising yoke means including a bearing plate positioned adjacent to the nozzle, said rod means extending slidably through said bearing plate.

7. Apparatus according to claim 6 further comprising a bearing lug on said actuator plate, said rod means being slidably received through said bearing lug, spring means positioned around said rod means between said bearing lug and said bearing plate to maintain said other end of said actuator plate in contact with said means driven by said motor, said one end of said actuator plate squeezing the nozzle against said bearing plate upon activation of said motor.

8. Apparatus according to claim 2 further comprising a bag support plate having an aperture therein, the nozzle being received through said aperture.

9. Apparatus according to claim 8 further comprising clip means to hold the bag on said bag support plate.

10. Apparatus according to claim 8, the apparatus being capable of dispensing fluid material from a plurality of bags each having a nozzle attached thereto, said bag support plate having a compartment for each bag and an aperture for each nozzle.

11. Apparatus according to claim 2 further comprising a housing for said motor, said housing including a C-shaped frame having upper and lower branches, said motor being carried by said lower branch of said C-shaped frame.

12. Apparatus according to claim 11 further comprising means in said housing to control the length of time said motor operates after activation thereof.

13. Apparatus according to claim 11 further comprising a main housing carrying the bag and said actuator plate, a chamber receiving said housing for said motor, said chamber communicating with said main housing, a heating element carried by said upper branch of said C-frame, a motor driven fan carried by said upper branch of said C-frame and blowing air past said heating element to warm the air exposed thereto, and means in said housing for said motor to transmit the heated air to said main housing.

14. Apparatus according to claim 11 said housing for said motor having a slot therein to receive said other end of said actuator plate, said means driven by said motor being positioned in said housing for said motor adjacent to said slot so that said actuator plate may engage said means driven by said motor.

15. Apparatus according to claim 11 further comprising a main housing having a ledge near the bottom thereof, yoke means carried on said ledge of said main housing, said lower branch of said C-shaped frame extending outwardly of said housing for said motor and engaging said ledge and said yoke means.

16. Apparatus according to claim 15 wherein said yoke means includes a bearing plate positioned adjacent to said nozzle a fixed distance from said lower branch of said C-shaped frame.

17. Apparatus according to claim 2, the apparatus being capable of dispensing fluid material from a plurality of bags each having a nozzle attached thereto, further comprising a housing carrying the bags and said actuator plate.

18. Apparatus according to claim 17 wherein said other end of said actuator plate has a plurality of V-shaped slots to engage the like plurality of nozzles.

19. Apparatus according to claim 18 further comprising means to position a said V-shaped slot of said actuator plate adjacent to a nozzle.

20. Apparatus according to claim 19 wherein said housing has a slot therein, said means to position including a rod having one end slidable in said slot.

21. Apparatus according to claim 20 wherein the other end of said rod activates said motor.

22. Apparatus according to claim 21 further comprising a platform formed in said housing adjacent to a portion of said slot, said platform assuring that said rod will not activate said motor unless a said V-shaped slot is aligned with a nozzle.

23. Apparatus according a claim 20 further comprising yoke means carried by said housing, said yoke means having a bearing plate positioned adjacent to the plurality of nozzles on the side opposite said V-shaped slots of said actuator plate, said rod being slidably received through said bearing plate.

24. Apparatus according to claim 23, further comprising a bearing lug on said actuator plate, said rod being slidably received through said bearing lug, spring means positioned around said rod between said bearing lug and said bearing plate to maintain said other end of said actuator plate in engagement with said means driven by said motor.

25. Apparatus for dispensing fluid material from a plurality of bags, each bag having a nozzle attached thereto, which emit material upon contact comprising housing means carrying the bags, a motor, means to select the bag from which the fluid material is to be dispensed and to activate said motor, and means driven by said motor to engage the nozzle of the selected bag and thereby dispense fluid therefrom.

26. Apparatus according to claim 25 further comprising means to heat the air in said housing means.

27. Apparatus according to claim 25 wherein said housing means includes a main housing and a bag support plate, said main housing and said bag support plate each having apertures aligned with but spaced from each other to receive each nozzle, said means driven by said motor being received in the space between said aligned apertures.

28. Apparatus according to claim 27 wherein said bag support plate has compartments, each compartment receiving a bag of fluid material and each compartment having a said aperture aligned with a said aperture in said main housing.

29. Apparatus according to claim 25 wherein said means to select and to activate includes rod means and said means driven by said motor includes plate means, said plate means having V-shaped slots on one end thereof to selectively engage a nozzle, said rod means carrying said plate means to align a said V-shaped slot with a nozzle but being movable with respect to said plate means to activate said motor.

30. Apparatus according to claim 29 wherein said means driven by said motor further includes cam means rotated by said motor and engaging another end of said plate means.

31. Apparatus according to claim 30 further comprising biasing means around said rod means and maintaining said plate means in engagement with said cam means.

32. Apparatus according to claim 25 wherein said housing means has a slot therein and said means to select and to activate includes rod means movable in said slot, said means driven by said motor includes plate means having V-shaped slots on one end thereof to selectively engage a nozzle, said rod means moving in said slot to position a said V-shaped slot in alignment with a nozzle.

33. Apparatus according to claim 32 wherein said housing means includes a platform adjacent to a portion of said slot, said platform prohibiting said rod means from activating said motor if a said V-shaped slot is not aligned with a nozzle.

34. Apparatus according to claim 25 wherein said housing means includes a ledge and further comprising yoke means carried by said ledge, a motor housing carrying said motor and engaging said yoke means and said ledge.

35. Apparatus according to claim 34 wherein said yoke means includes a bearing plate positioned adjacent to the nozzles, said means driven by said motor squeezing a said nozzle against said bearing plate.

36. Apparatus according to claim 25 further comprising second housing means detachable from said housing means and carrying said motor.

37. Apparatus according to claim 36, said second housing means including a C-shaped frame having an upper branch and a lower branch, said motor being carried by said lower branch.

38. Apparatus according to claim 37 wherein said means to select and to activate includes switch means carried by said lower branch and rod means to engage said switch means and to activate said motor.

39. Apparatus according to claim 37 further comprising a motor driven fan carried by said upper branch of said frame, a heating element positioned within said second housing means, said fan directing air toward said heating element to heat the air above said lower branch, and means to transmit the heated air from said second housing means to said housing means.

* * * * *